(12) United States Patent
Zou et al.

(10) Patent No.: US 9,923,854 B2
(45) Date of Patent: Mar. 20, 2018

(54) MICROBLOG INFORMATION PUBLISHING METHOD, SERVER AND STORAGE MEDIUM

(71) Applicant: TENCENT TECHNOLOGY (SHENZHEN) COMPANY LIMITED, Shenzhen, Guangdong (CN)

(72) Inventors: He Zou, Shenzhen (CN); Guanghui Yang, Shenzhen (CN); Dong Chen, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 754 days.

(21) Appl. No.: 14/262,252

(22) Filed: Apr. 25, 2014

(65) Prior Publication Data
US 2014/0237384 A1    Aug. 21, 2014

Related U.S. Application Data

(63) Continuation of application No. PCT/CN2013/074549, filed on Apr. 23, 2013.

(30) Foreign Application Priority Data

Apr. 26, 2012  (CN) .................. 2012 1 01268494

(51) Int. Cl.
*G06F 17/00* (2006.01)
*G06F 17/24* (2006.01)
(Continued)

(52) U.S. Cl.
CPC ............ *H04L 51/24* (2013.01); *G06Q 10/10* (2013.01); *G06Q 50/01* (2013.01); *H04L 51/046* (2013.01);
(Continued)

(58) Field of Classification Search
USPC ................ 709/206, 223, 204–205, 217, 219
See application file for complete search history.

(56) References Cited

U.S. PATENT DOCUMENTS

2004/0003344 A1* 1/2004 Lai ...................... G06F 17/2755
715/206
2009/0265243 A1* 10/2009 Karassner ............. G06Q 30/02
705/14.54
(Continued)

FOREIGN PATENT DOCUMENTS

CN    102209137 A    10/2011
CN    102316409 A    1/2012
(Continued)

OTHER PUBLICATIONS

International Search Report in international application No. PCT/CN2013/074549, dated Aug. 1, 2013.
(Continued)

*Primary Examiner* — Jude Jean Gilles
(74) *Attorney, Agent, or Firm* — Oppedahl Patent Law Firm LLC

(57) ABSTRACT

A microblog information publishing method, a server and a storage medium are described, which pertain to the technical field of networks. The method includes: acquiring information to be published of a first user, which includes information contents and an information notification object account; and publishing the information contents through the information notification object account. The server includes an acquiring module and a publishing module. A service for users to publish a message anonymously is provided, namely, the information is published through an anonymous account without displaying the original publisher, so that the privacy of the user is better protected and the microblog service becomes three-dimensional and diversified.

18 Claims, 4 Drawing Sheets

(51) Int. Cl.
*H04L 12/58* (2006.01)
*H04L 29/08* (2006.01)
*H04L 29/06* (2006.01)
*G06Q 10/10* (2012.01)
*G06Q 50/00* (2012.01)

(52) U.S. Cl.
CPC .......... *H04L 63/0421* (2013.01); *H04L 67/02* (2013.01); *H04L 67/26* (2013.01); *H04L 63/102* (2013.01)

(56) References Cited

U.S. PATENT DOCUMENTS

| | | | | |
|---|---|---|---|---|
| 2009/0276500 | A1* | 11/2009 | Karmarkar | G06F 17/30864 709/206 |
| 2009/0320101 | A1 | 12/2009 | Doyle, III | |
| 2012/0066212 | A1* | 3/2012 | Jennings | G06F 17/30144 707/723 |
| 2012/0089691 | A1 | 4/2012 | Kim | |
| 2012/0131438 | A1* | 5/2012 | Li | G06F 21/604 715/234 |
| 2012/0221953 | A1* | 8/2012 | Alterman | G06F 17/3089 715/733 |
| 2012/0246191 | A1* | 9/2012 | Xiong | G06Q 50/01 707/769 |
| 2012/0265814 | A1* | 10/2012 | Roussis | G06Q 10/10 709/204 |
| 2013/0212055 | A1* | 8/2013 | Sainz Gonzalez | G06N 5/00 706/46 |
| 2013/0339465 | A1* | 12/2013 | Zhang | H04L 51/16 709/206 |
| 2014/0317504 | A1* | 10/2014 | Zhang | H04L 12/1859 715/708 |

FOREIGN PATENT DOCUMENTS

| | | |
|---|---|---|
| KR | 101064735 B1 | 9/2011 |
| KR | 20110136308 A | 12/2011 |

OTHER PUBLICATIONS

English Translation of the Written Opinion of the International Search Authority in international application No. PCT/CN2013/074549, dated Aug. 1, 2013.
Notification of the First Office Action of Korean application No. 2015020373894, dated Mar. 26, 2015.
Friends, Please Enter Shu Dong Micro-blog to Request Song! Nov. 2, 2011.
Supplementary European Search Report in European application No. 13781377.0, dated Mar. 12, 2015.
Notification of the First Office Action of Japanese application No. 2014-537487, dated Jul. 14, 2015.
Twitter, [retrieved on Jul. 8, 2015] retrieved from the Internet, URL, https://twitter.com/anonyProxystatuses/195058681052790785, dated Apr. 25, 2012.
800 million people worldwide use Facebook to enjoy the communication with friends, for the first time can quickly adapt to the smartphone, Japan, ASCII Media Works, Apr. 23, 2012.
Enterprise Weibo Management Manual, dated Jun. 30, 2011.
Notification of the Second Office Action of Chinese application No. 201210126849.4, dated Sep. 13, 2017.

* cited by examiner

MICROBLOG INFORMATION PUBLISHING METHOD, SERVER AND STORAGE MEDIUM

CROSS-REFERENCE TO RELATED APPLICATIONS

This is a continuation application of International Patent Application No. PCT/CN2013/074549, filed on Apr. 23, 2013, which claims priority to Chinese Patent Application No. 201210126849.4 filed on Apr. 26, 2012, the disclosure of which is incorporated by reference herein in its entirety.

TECHNICAL FIELD

The disclosure relates to the technical field of networks, and in particular to a microblog information publishing method, a server and a storage medium.

BACKGROUND

In existing microblog information publishing systems, a user and the user's published messages are closely related. When the user publishes a message, a user name of the user and the message may be displayed in a message list at the same time, generally, in a specific form of "user name: specific contents of the message". Therefore, each message published by the user is traceable, and any user can trace the original publisher according to the message published by the user, which is not favourable for the privacy protection of the user and relatively limits the service of the microblog.

SUMMARY

Embodiments of the disclosure provide a microblog information publishing method, a server and a storage medium, which can protect the privacy of users and realize a three-dimensional and diversified microblog service.

According to an embodiment of the disclosure, a microblog information publishing method is provided, which includes the following steps:

information to be published of a first user, which includes information contents and an information notification object account, is acquired; and the information contents are published through the information notification object account.

Another embodiment of the disclosure provides a server including an acquiring module and a publishing module.

The acquiring module is configured to acquire the information to be published of a first user, which includes information contents and an information notification object account.

The publishing module is configured to publish the information contents through the information notification object account.

Another embodiment of the disclosure provides a non-transitory computer readable storage medium storing a set of computer executable instructions that, when executed, cause a microblog information publishing method to be performed, which includes the following steps:

information to be published of a first user, which includes information contents and an information notification object account, is acquired; and the information contents are published through the information notification object account.

The microblog information publishing method, the server and the storage medium provided by the embodiments of the disclosure have the following advantages:

the information to be published of the first user, which includes information contents and the information notification object account, is acquired; and the information contents are published through the information notification object account. With the technical solutions of the disclosure, a service for users to publish information anonymously is provided, namely, the information is published through an anonymous account without displaying the original publisher, so that the privacy of the user is better protected and the microblog service becomes three-dimensional and diversified.

BRIEF DESCRIPTION OF THE DRAWINGS

To illustrate the technical solutions of the embodiments of the disclosure more clearly, the drawings referred to in the description of the embodiments are briefly described below. It should be understood that the drawings described below are only some embodiments of the disclosure, and those skilled in the art may further obtain other drawings according to these drawings without exercising inventive skill.

DETAILED DESCRIPTION

To illustrate the objective, technical solutions and advantages of the disclosure more clearly, embodiments of the disclosure are described below in conjunction with the accompanying drawings in detail.

It should be noted that, according to embodiments of the disclosure, a user can log in to a server either in the form of a web page or from a client, which is not specifically limited in the embodiments of the disclosure.

Embodiment 1

Figure 1:
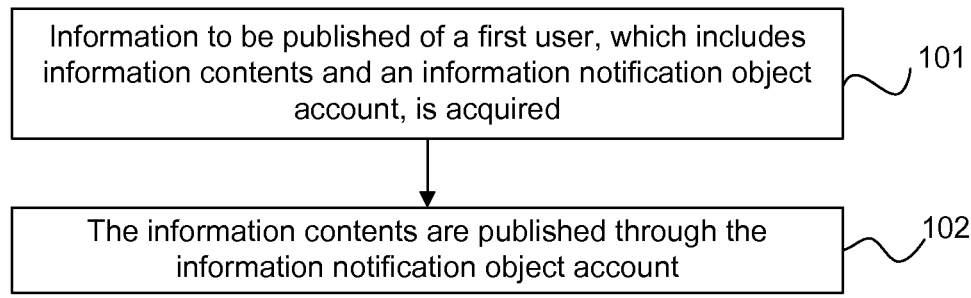
FIG. 1 illustrates a flowchart of a microblog information publishing method according to an embodiment of the disclosure.

FIG. 1 illustrates a flowchart of a microblog information publishing method according to an embodiment of the disclosure. As shown in FIG. 1, the method of the embodiment includes the following steps:

At step 101, information to be published of a first user, which includes information contents and an information notification object account, is acquired.

At step 102, the information contents are published through the information notification object account.

In an example, before the information to be published of the first user is acquired, the method may include the following step:

a preset application page is displayed, which has an interface corresponding to the information notification object account; and the information contents input by the first user on the preset application page and a sending request are received.

And the step of acquiring the information to be published of the first user includes the following steps:

the interface is invoked to acquire the information notification object account, and the information to be published of the first user is acquired, which includes the information contents input by the first user on the preset application page and the information notification object account.

In an example, before information to be published of the first user is acquired, the method may include the following steps:

a preset application page is displayed, which has an interface corresponding to the information notification object account, and the information contents input by the first user in the comment box of any message in a message list on the preset application page and a request for comment are received.

And the step of acquiring the information to be published of the first user includes the following steps:

the interface is invoked to acquire the information notification object account, and the information to be published of the first user is acquired, which includes the information contents input by the first user in the comment box of any message in the message list on the preset application page and the information notification object account.

In an example, the step of publishing the information contents through the information notification object account includes the following step:

the information contents are published, through the information notification object account, in the comment box of any message in the message list on the preset application page.

In an example, after the information contents are published through the information notification object account, the method may include the following step:

when a second user publishes comment information for commenting on the information contents, the first user is notified of the comment information.

In an example, after the information contents are published through an anonymous account, the method may include the following step:

the information contents published through the information notification object account are detected according to an audit policy, and the information to be published of the first user is refused when it is determined that the number of times that the first user publishes information contents that do not meet the audio policy exceeds a preset number of times.

According to the method provided by embodiments of the disclosure, the information to be published of the first user, which includes information contents and an information notification object account, is acquired; and the information contents are published through the information notification object account. The technical solutions of the disclosure provide a service for users to publish information anonymously. The information is published through an anonymous account without displaying the original publisher, so that the privacy of the user is better protected and the microblog service becomes three-dimensional and diversified.

Embodiment 2

Figure 2:
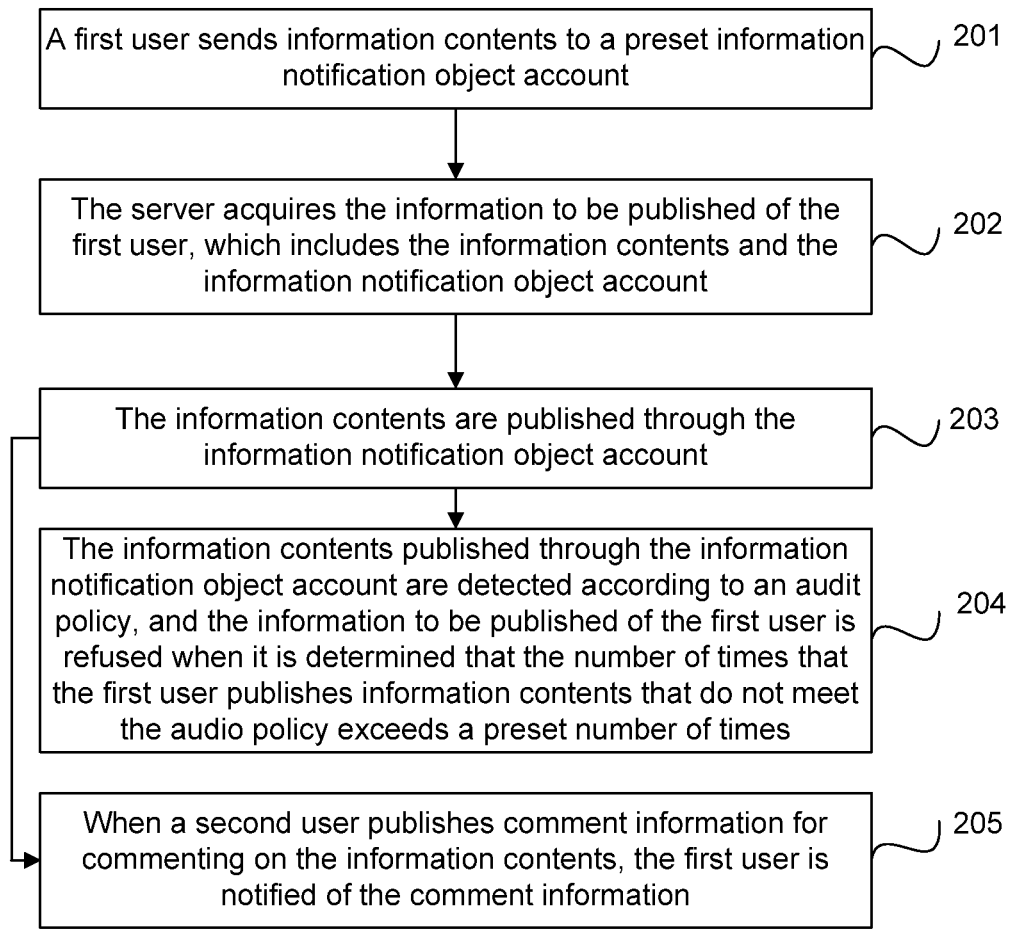
FIG. 2 illustrates a flowchart of a microblog information publishing method according to an embodiment of the disclosure.

FIG. 2 illustrates a flowchart of a microblog information publishing method according to another embodiment of the disclosure. According to the embodiment, the method is performed by a server, such as a microblog server. As shown in FIG. 2, the method according to the embodiment includes the following steps:

At step 201, a first user sends information contents to a preset information notification object account.

When the first user wants to publish a message anonymously, the first user can send the information contents to the preset information notification object account to trigger information publication, so that the server can acquire the information to be published of the first user. The information to be published includes the information contents and the information notification object account.

The preset information notification object account is set or adjusted by the server. The preset information notification object account may be multiple different accounts, such as "tree hole" and "anonymous publishing account". In addition, traffic can be set for each preset information notification object account, namely, an upper limit is set on the number of the messages that can be received and published through the preset information notification object account, in order that the publishing speed of each preset information notification object account is not affected by the number of received messages.

In an example, the first user may send the information contents to the preset information notification object account through a private message or a secret message. For example, user A sends a private message "Today is Mother's Day" to the preset information notification object account "tree hole".

At step 202, the server acquires the information to be published of the first user, which includes the information contents and the information notification object account.

In the embodiment, when the server acquires the information to be published of the first user and knows, according to the information notification object account, that the first user requests to publish the information anonymously, the server needs to extract the information contents included in the information to be published in order for anonymous publication. Therefore, the server extracts the information contents included in the information to be published as information to be published anonymously.

For example, based on the example in step 201, when user A sends the private message "Today is Mother's Day" to the preset information notification object account "tree hole", the server acquires the information to be published of the first user, which includes the preset information notification object account "tree hole" and the information contents "Today is Mother's Day".

At step 203, the information contents are published through the information notification object account.

The information notification object account in step 203 and the preset information notification object account in step 201 may be either identical or different. The information notification object account is set or adjusted by the server. For example, the preset information notification object account may be an "anonymous one" or "nameless one". In addition, traffic can be set for each information notification object account, namely, an upper limit is set on the number of the messages that can be published through an anonymous account, in order that the publishing speed of each information notification object account is not affected by the number of received messages.

For example, based on the example in step 202, the server acquires the information to be published of the first user, which includes the preset information notification object account "tree hole" and the information contents "Today is Mother's Day", and publishes the information contents "Today is Mother's Day" of user A through the preset information notification object account "nameless one".

In an example, after step 203, the method according to the embodiment may further include the following step:

At step 204, the information contents published through the information notification object account are detected according to an audit policy, and the information to be published of the first user is refused when it is determined that the number of times that the first user publishes information contents that do not meet the audio policy exceeds a preset number of times.

In the embodiment, to detect the information contents published through the information notification object account according to the audit policy is to detect the information to be published of the first user. Because a user who uses the services provided by the server may publish an illegal message through the anonymous publishing function, it is necessary to detect the message published by each user through the anonymous publishing function according to a preset background audit policy. The information to be published of the first user is refused when it is determined that the number of times that the first user publishes information contents that do not meet the audio policy exceeds a preset number of times. The preset number of times can be set or adjusted by a server manager.

Preferably, refusing the information to be published of the first user, when it is determined that the number of times that the first user publishes information contents that do not meet the audio policy exceeds a preset number of times, includes the following steps: the information to be published of the first user is refused for a preset period when it is determined that the number of times that the first user publishes information contents that do not meet the audio policy exceeds a preset number of times. The preset period may be set or adjusted by a server manager. When it is determined that times that the first user publishes the information contents that do not meet the audio policy (i.e., illegal messages) exceeds the preset times, the first user is disabled to use the anonymous publishing function within a subsequent preset period, namely, the information to be published of the first user is refused.

To ensure the normal use of the user, the server may enable the first user after the preset period, namely, the information to be published of the first user is allowed to be published when it is received.

In an example, after step 203, the method according to the embodiment may further include the following step:

At step 205, when a second user publishes comment information for commenting on the information contents, the first user is notified of the comment information.

When other users comment on the message published by the anonymous user, the first user can be notified of the comment information in order that the first user can know the dynamic state of the anonymous information published thereby for immediate attention. The first user may be notified through either a private message or a secret message. In an example, when the second user publishes comment information, the server sends the comment information or the comment event to the first user as private message contents.

According to the microblog information publishing method of the embodiment of the disclosure, the information to be published of the first user, which includes the information contents and the information notification object account, is acquired; and the information contents are published through the information notification object account.

With the technical solutions of the disclosure, a service for users to publish information anonymously is provided, namely, the information is published through an anonymous account without displaying the original publisher, so that the privacy of the user is better protected and the microblog service becomes three-dimensional and diversified. Furthermore, the information contents are acquired in the existing private message way, so that the publisher is only visible to the server, and the privacy of the user is protected.

Embodiment 3

Figure 3:
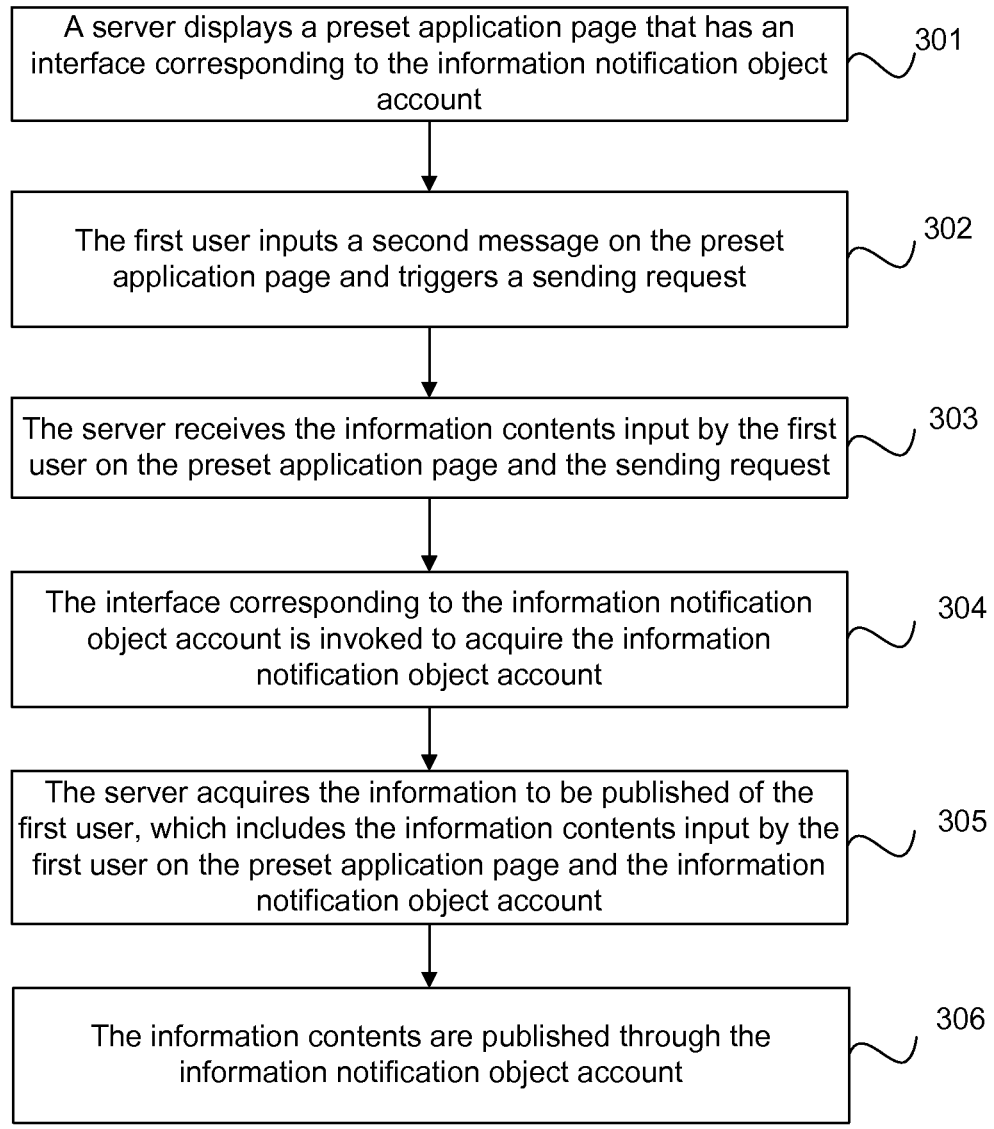
FIG. 3 illustrates a flowchart of a microblog information publishing method according to an embodiment of the disclosure.

FIG. 3 illustrates a flowchart of a microblog information publishing method according to another embodiment of the disclosure. Embodiment 3 is different from Embodiment 2 in the method for triggering an anonymous publication. In Embodiment 2, the information to be published including information contents and an information notification object account is directly acquired by a server to trigger the anonymous publication; while in Embodiment 3, the information contents input by a first user on a preset application page and a sending request are received on the preset application page, and then the information to be published including the information contents and the information notification object account are acquired to trigger the anonymous publication. As shown in FIG. 3, the method according to the embodiment includes the following steps:

At step 301, a server displays a preset application page that has an interface corresponding to the information notification object account.

When the first user wants to publish a message anonymously, the first user can trigger a request of switching to the preset application page. The server displays the preset application page when receiving the request.

The preset application page is set or adjusted by the server. In an example, the preset application page can be of any of the following conditions: (1) the preset application page may be an application, a function or a service, which can be customized by the user and is presented in an application list of the user in the form of an option or a button; the user clicks the option or the button in the application list to trigger the request of switching to the preset application page, so that the server displays the preset application page; (2) the preset application page may be an application, a function or a service and is presented in the form of an option or a button on a home page where the message is published; the user clicks the option or the button to trigger the request of switching to the preset application page, so that the server displays the preset application page.

For example, the preset application page may be a "tree hole page" or an "anonymously publishing page", which is not specifically limited in the embodiment.

At step 302, the first user inputs a second message on the preset application page and triggers a sending request.

It should be noted that the preset application page provides a dialog box for the user to input the information contents. When the first user inputs the information contents in the dialog box and triggers the sending request, the information contents are not displayed on the preset application page. After the server receives the information contents and the sending request, the server acquires the information to be published of the first user and publishes the information to be published through an anonymous account. The information contents are displayed in a broadcasting hall and on a specified page after being published by the server. The specified page may be a page for displaying the anonymously published information or a page specified by the user.

For example, user A triggers a request of switching to a tree hole page, inputs "Today is Father's Day" on the tree hole page and triggers the sending request.

At step 303, the server receives the information contents input by the first user on the preset application page and the sending request.

When the server receives the information contents input by the first user on the preset application page and the sending request, the invoking of the interface in step 304 is triggered to acquire the information notification object account, so that the server can perform the anonymous publishing process according to the information notification object account and the input information contents.

At step 304, the interface corresponding to the information notification object account is invoked to acquire the information notification object account.

Step 304 may include that: when the server receives the information contents input by the first user on the preset application page and the sending request, the interface corresponding to the information notification object account is invoked to send the information contents input by the first user on the preset application page to the information notification object account in the form of a private message, so that the server can acquire the information to be published of the first user.

At step 305, the server acquires the information to be published of the first user, which includes the information contents input by the first user on the preset application page and the information notification object account.

At step 305 is similar to step 202, with the difference only lying in that the information contents included in the information to be published are those input by the first user on the preset application page, which is therefore not elaborated here.

At step 306, the information contents are published through the information notification object account.

The information notification object account in step 306 and the preset information notification object account in step 303 may be either identical or different. The information notification object account is set or adjusted by the server. For example, based on the example of step 302, when user A triggers the request of switching to the tree hole page, input "Today is Father's Day" on the tree hole page and triggers the sending request, the interface is invoked to acquire the "nameless account", so that the server acquires the information to be published that includes the "nameless account" and the information contents "Today is Father's Day", and publishes the "Today is Father's Day" through the "nameless account".

In an example, after step 306, the method according to the embodiment may further include step 307, which is similar to step 204 in Embodiment 2 and is therefore not elaborated here.

In an example, after step 306, the method according to the embodiment may further include step 307, which is similar to step 205 in Embodiment 2 and is therefore not elaborated here.

According to the microblog information publishing method of the embodiment of the disclosure, the information to be published of the first user, which includes the information contents and the information notification object account, is acquired; and the information contents are published through the information notification object account. With the technical solutions of the disclosure, a service for users to publish information anonymously is provided, namely, the information is published through an anonymous account without displaying the original publisher, so that the privacy of the user is better protected and the microblog service becomes three-dimensional and diversified. Furthermore, through the preset application page and the interface for acquiring the information notification object account on the preset application page, the anonymously publishing flow is simplified.

Embodiment 4

Figure 4:
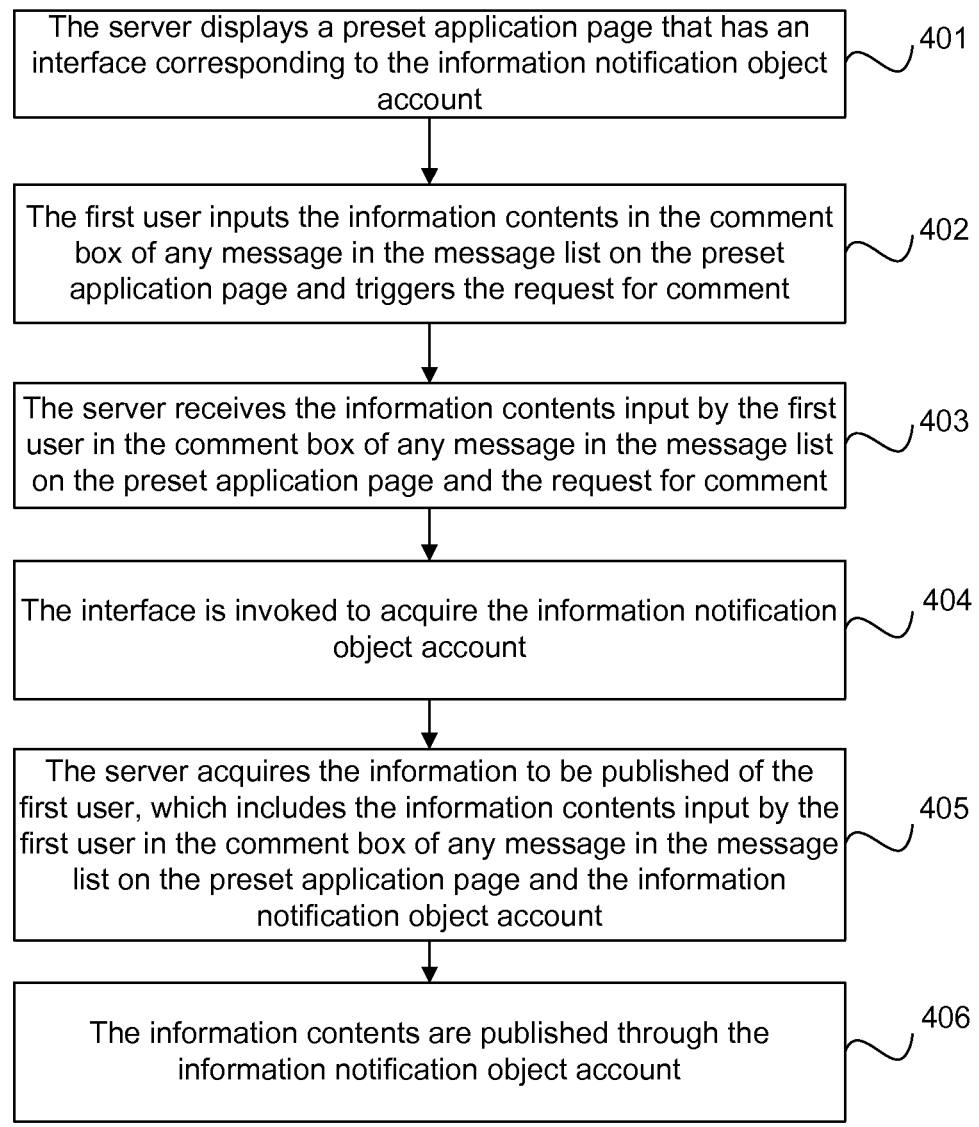
FIG. 4 illustrates a flowchart of a microblog information publishing method according to an embodiment of the disclosure.

FIG. 4 illustrates a flowchart of a microblog information publishing method according to another embodiment of the disclosure. Embodiment 4 is different from Embodiment 3 in the method for triggering an anonymous publication. In Embodiment 3, the anonymous publishing is indirectly triggered by a first user on a preset application page; while in Embodiment 4, the information contents input by the first user in the comment box of any message in a message list on the preset application page and a request for comment are received, and then the information to be published including the information contents and the information notification object account are acquired to trigger the anonymous publishing. As shown in FIG. 4, the method according to the embodiment includes the following steps:

At step 401, the server displays a preset application page that has an interface corresponding to the information notification object account.

Step 401 is similar to step 301 in principle, which is therefore nor elaborated here.

At step 402, the first user inputs the information contents in the comment box of any message in the message list on the preset application page and triggers the request for comment.

When the first user is in login state and wants to publish a message anonymously, the first user triggers a request of switching to the preset application page. The server displays the preset application page after receiving the request. When the preset application page is displayed, a message list thereof is displayed on the preset application page, so that the first user can input the information contents in the comment box of any message of the message list and trigger the request for comment to comment on the message.

It should be noted that the information contents are not displayed on the preset application page when the first user inputs the information contents in the comment box and triggers the request for comment. For example, if the message list shows the message "A heavy rain today again", the first user inputs information contents "Yes-" in the comment box of a third message on the tree hole page and click comment to confirm the comment on the message, but the information contents "Yes-" is not displayed in the comment box of the message.

At step 403, the server receives the information contents input by the first user in the comment box of any message in the message list on the preset application page and the request for comment.

When the server receives the information contents input by the first user in the comment box of any message in the message list on the preset application page and the request for comment, the invoking of the interface in step 404 is triggered to acquire the information notification object account, so that the server can perform the anonymous publishing process according to the information notification object account and the input information contents.

At step 404, the interface is invoked to acquire the information notification object account.

Step 404 may include that: when the server receives the information contents input by the first user in the comment box of any message in the message list on the preset application page and the request for comment, the interface corresponding to the information notification object account is invoked to send the information contents to the information notification object account in the form of a private message, so that the server can acquire the information to be published of the first user.

At step 405, the server acquires the information to be published of the first user, which includes the information contents input by the first user in the comment box of any message in the message list on the preset application page and the information notification object account.

Step 405 is similar to step 202, with the difference only lying in that the information contents included in the information to be published are those input by the first user in the comment box of any message in the message list on the preset application page, which is therefore not elaborated here.

At step 406, the information contents are published through the information notification object account.

It should be noted that, the information contents are the information for commenting on the message, so the information contents are published in the comment list of the message through the information notification object account. The specific format of the commenting list is consistent with that of a conventional commenting list, which is therefore not elaborated here.

In an example, after step 406, the method according to the embodiment further includes step 407, which is similar to step 204 in Embodiment 2 and is therefore not elaborated here.

In an example, after step 406, the method according to the embodiment further includes step 408, which is similar to step 205 in Embodiment 2 and is therefore not elaborated here.

According to the microblog information publishing method of the embodiment of the disclosure, the information to be published of the first user, which includes the information contents and the information notification object account, is acquired; and the information contents are published through the information notification object account. With the technical solutions of the disclosure, a service for users to publish information anonymously is provided, namely, the information is published through an anonymous account without displaying the original publisher, so that the privacy of the user is better protected and the microblog service becomes three-dimensional and diversified. Furthermore, through the preset application page and the anonymous commenting function in the message list of the preset application page, the application range of the anonymous publishing becomes wider.

Embodiment 5

Figure 5:
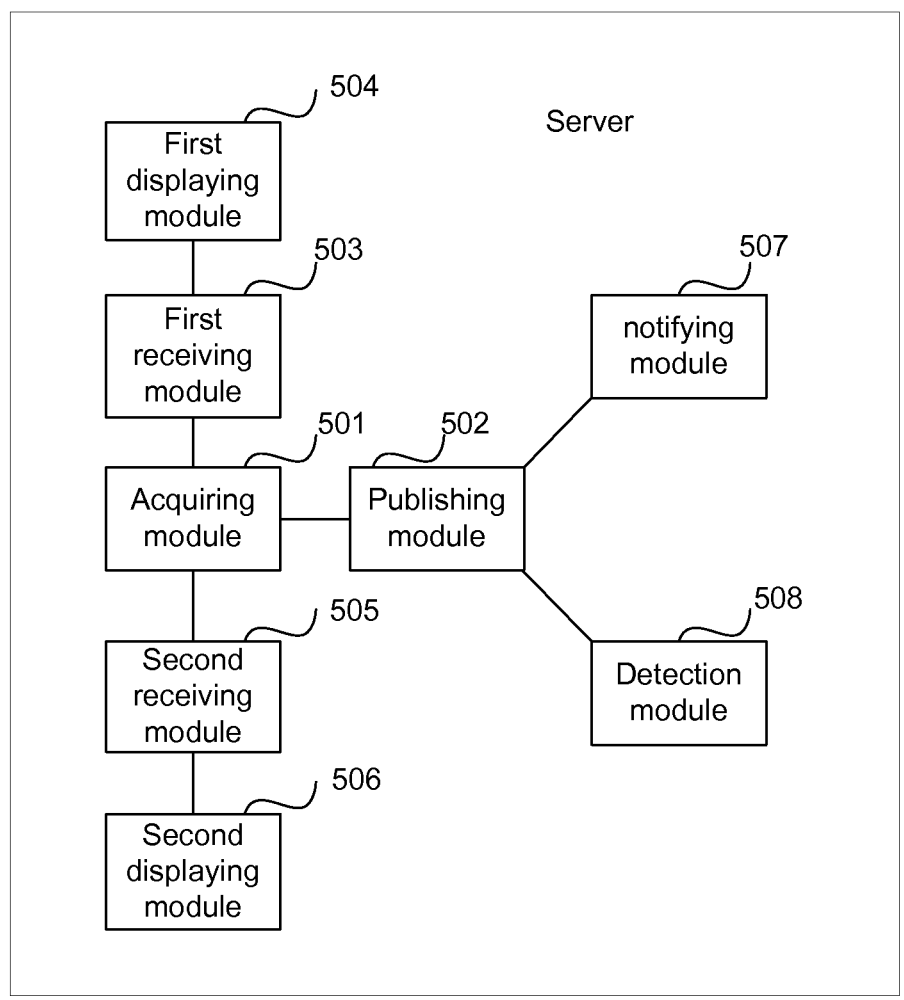
FIG. 5 illustrates a structural diagram of a server according to an embodiment of the disclosure.

FIG. 5 illustrates a structural diagram of a server according to an embodiment of the disclosure. As shown in FIG. 5, the server includes an acquiring module 501 and a publishing module 502.

The acquiring module 501 is configured to acquire information to be published of a first user, which includes information contents and an information notification object account.

The publishing module 502 is configured to publish the information contents through the information notification object account.

In an example, the server further includes a first displaying module 503 and a first receiving module 504.

The first displaying module 503 is configured to display a preset application page that has an interface corresponding to the information notification object account;

the first receiving module 504 is configured to receive the information contents input by the first user on the preset application page and a sending request; and the acquiring module 501 is configured to: invoke the interface to acquire the information notification object account, and acquire the information to be published of the first user, which includes the information contents input by the first user on the preset application page and the information notification object account.

In an example, the server further includes a second displaying module 505 and a second receiving module 506.

The second displaying module 505 is configured to display a preset application page that has an interface corresponding to the information notification object account;

the second receiving module 506 is configured to receive the information contents input by the first user in the comment box of any message in a message list on the preset application page and a request for comment; and the acquiring module 501 is configured to: invoke the interface to acquire the information notification object account, and acquire the information to be published of the first user, which includes the information contents input by the first user in the comment box of any message in the message list on the preset application page and the information notification object account.

In an example, the publishing module 502 is configured to publish the information contents in the comment box of any message in the message list on the preset application page through the information notification object account.

In an example, the server further includes a notifying module 507.

The notifying module 507 is configured to, when a second user publishes comment information for commenting on the information contents, notify the first user of the comment information.

In an example, the server further includes a detection module 508.

The detection module 508 is configured to detect the information contents published through the information notification object account according to an audit policy, and refuse the information to be published of the first user when it is determined that the number of times that the first user publishes information contents that do not meet the audio policy exceeds a preset number of times.

It should be noted that the server provided by the embodiment is only illustrated through the division of each functional module above when publishing the microblog information. In practical application, the above functions can be completed by different functional modules as required, namely, the internal structure of the server is divided into different functional modules to complete all or part of the functions described above. In addition, the server provided by the embodiment of the disclosure and the embodiments of the microblog information publishing method belong to the same concept, with the specific implementation process as described in the method embodiments in detail, which is therefore not elaborated here.

Numbering of the embodiments in the disclosure is merely for illustration and does not indicate preference of one embodiment over another.

It could be understood by those skilled in the art that all of or part of the steps of the above embodiments may be implemented by hardware, or by corresponding hardware instructed by a program. The program may be stored in a computer-readable storage medium, such as a read-only storage, a disk or a compact disc.

The above description only refers to the preferred embodiments of the disclosure, and is not intended to limit the scope of the disclosure. Any modifications, equivalent replacements and improvements to the embodiments, as long as being within the principle of the disclosure, should fall within the scope of the disclosure.

The invention claimed is:

1. A microblog information publishing method, comprising:
   acquiring information to be published of a first user, wherein the information to be published includes information contents and an information notification object account; and
   publishing the information contents through the information notification object account, wherein the method further comprises the step, preceding the step of acquiring information to be published of a first user, of:
   displaying a preset application page that has an interface corresponding to the information notification object account; and
   receiving information contents input by the first user on the preset application page and a sending request;
   wherein, the acquiring information to be published of the first user comprises:
   invoking the interface to acquire the information notification object account; and
   acquiring the information to be published of the first user, wherein the information to be published includes the information contents input by the first user on the preset application page and the information notification object account.

2. A microblog information publishing method, comprising:
   acquiring information to be published of a first user, wherein the information to be published includes information contents and an information notification object account; and
   publishing the information contents through the information notification object account, wherein the method further comprises the step, preceding the step of acquiring information to be published of a first user, of:
   displaying a preset application page that has an interface corresponding to the information notification object account; and
   receiving information contents input by the first user in a comment box of any message in a message list on the preset application page and a request for comment;
   wherein, the acquiring information to be published of the first user comprises:
   invoking the interface to acquire the information notification object account; and
   acquiring the information to be published of the first user, wherein the information to be published includes the information contents input by the first user in the comment box of any message in the message list on the preset application page and the information notification object account.

3. The method according to claim 2, wherein the publishing the information contents through the information notification object account comprises:
   publishing the information contents in the comment box of any message in the message list on the preset application page through the information notification object account.

4. The method according to claim 1, further comprising the step, after the step of publishing the information contents through the information notification object account, of:
   when a second user publishes comment information for commenting on the information contents, notifying the first user of the comment information.

5. A server, comprising:
   a processor; and
   a memory for storing instructions executable by the processor, wherein the processor is configured to execute the instructions to
   acquire information to be published of a first user, wherein the information to be published includes information contents and an information notification object account; and
   publish the information contents through the information notification object account,
   display a preset application page that has an interface corresponding to the information notification object account; and
   receive information contents input by the first user on the preset application page and a sending request;
   wherein, the processor is further configured to: invoke the interface to acquire the information notification object account, and acquire the information to be published of the first user; wherein the information to be published includes the information contents input by the first user on the preset application page and the information notification object account.

6. A server, comprising:
   a processor; and
   a memory for storing instructions executable by the processor, wherein the processor is configured to execute the instructions to
   acquire information to be published of a first user, wherein the information to be published includes information contents and an information notification object account;
   publish the information contents through the information notification object account;
   wherein the server
   display a preset application page that has an interface corresponding to the information notification object account; and
   receive information contents input by the first user in the comment box of any message in a message list on the preset application page and a request for comment;
   wherein, the processor is further configured to: invoke the interface to acquire the information notification object account, and acquire the information to be published of the first user; wherein the information to be published includes the information contents input by the first user in the comment box of any message in the message list on the preset application page and the information notification object account.

7. The server according to claim 6, wherein the processor is further configured to publish the information contents in the comment box of any message in the message list on the preset application page through the information notification object account.

8. The server according to claim 5,
wherein the processor is further configured to, when a second user publishes comment information for commenting on the information contents, notify the first user of the comment information.

9. A non-transitory computer readable storage medium storing a set of computer executable instructions that, when executed, cause a microblog information publishing method to be performed, wherein the microblog information publishing method comprises:
acquiring information to be published of a first user, wherein the information to be published includes information contents and an information notification object account; and
publishing the information contents through the information notification object account, wherein the method further comprises the step, preceding the step of acquiring information to be published of a first user, of:
displaying a preset application page that has an interface corresponding to the information notification object account; and
receiving information contents input by the first user on the preset application page and a sending request;
wherein, the acquiring information to be published of the first user comprises:
invoking the interface to acquire the information notification object account; and
acquiring the information to be published of the first user, wherein the information to be published includes the information contents input by the first user on the preset application page and the information notification object account.

10. The method according to claim 1, further comprising the step, after the step of publishing the information contents through the information notification object account, of:
detecting the information contents published through the information notification object account according to an audit policy; and
refusing the information to be published of the first user when it is determined that a number of times that the first user publishes information contents that do not meet the audio policy exceeds a preset number of times.

11. The method according to claim 2, further comprising the step, after the step of publishing the information contents through the information notification object account, of:
detecting the information contents published through the information notification object account according to an audit policy; and
refusing the information to be published of the first user when it is determined that a number of times that the first user publishes information contents that do not meet the audio policy exceeds a preset number of times.

12. The method according to claim 3, further comprising the step, after the step of publishing the information contents through the information notification object account, of:
detecting the information contents published through the information notification object account according to an audit policy; and
refusing the information to be published of the first user when it is determined that a number of times that the first user publishes information contents that do not meet the audio policy exceeds a preset number of times.

13. The server according to claim 5, wherein the processor is further
configured to: detect the information contents published through the information notification object account according to an audit policy, and refuse the information to be published of the first user when it is determined that a number of times that the first user publishes information contents that do not meet the audio policy exceeds a preset number of times.

14. The server according to claim 6, wherein the processor is further
configured to: detect the information contents published through the information notification object account according to an audit policy, and refuse the information to be published of the first user when it is determined that a number of times that the first user publishes information contents that do not meet the audio policy exceeds a preset number of times.

15. The server according to claim 7, wherein the processor is further
configured to: detect the information contents published through the information notification object account according to an audit policy, and refuse the information to be published of the first user when it is determined that a number of times that the first user publishes information contents that do not meet the audio policy exceeds a preset number of times.

16. The server according to claim 8, wherein the processor is further urther comprising:
configured to: detect the information contents published through the information notification object account according to an audit policy, and refuse the information to be published of the first user when it is determined that a number of times that the first user publishes information contents that do not meet the audio policy exceeds a preset number of times.

17. The method according to claim 2, further comprising the step, after the step of publishing the information contents through the information notification object account, of:
when a second user publishes comment information for commenting on the information contents, notifying the first user of the comment information.

18. The server according to claim 6, wherein the processor is further
configured to, when a second user publishes comment information for commenting on the information contents, notify the first user of the comment information.

* * * * *